United States Patent
Chevallier

(10) Patent No.: US 12,372,841 B2
(45) Date of Patent: Jul. 29, 2025

(54) OPTICAL SYSTEM WITH AN ELECTROCHEMICAL FUNCTIONAL DEVICE HAVING ELECTRICALLY CONTROLLABLE OPTICAL AND/OR ENERGETIC PROPERTIES AND A COATING FOR CONTROLLING COLOUR IN REFLECTION, AND ASSOCIATED PROCESSES

(71) Applicant: SAINT-GOBAIN GLASS FRANCE, Courbevoie (FR)

(72) Inventor: Théo Chevallier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 491 days.

(21) Appl. No.: 17/785,722

(22) PCT Filed: Dec. 21, 2020

(86) PCT No.: PCT/FR2020/052582
§ 371 (c)(1),
(2) Date: Jun. 15, 2022

(87) PCT Pub. No.: WO2021/130442
PCT Pub. Date: Jul. 1, 2021

(65) Prior Publication Data
US 2023/0054012 A1    Feb. 23, 2023

(30) Foreign Application Priority Data
Dec. 24, 2019   (FR) .......................... 1915568

(51) Int. Cl.
*G02F 1/15*   (2019.01)
*G02F 1/153*  (2006.01)

(52) U.S. Cl.
CPC ............... *G02F 1/15* (2013.01); *G02F 1/153* (2013.01)

(58) Field of Classification Search
CPC . G02F 1/153; G02F 1/163; G02F 1/15; B32B 17/10036; B32B 17/10513; B32B 17/10651; B32B 17/10761
See application file for complete search history.

(56) References Cited

U.S. PATENT DOCUMENTS

| | | | |
|---|---|---|---|
| 5,792,559 A * | 8/1998 | Heithoff | B32B 17/10651 501/905 |
| 2001/0021066 A1 | 9/2001 | Tonar et al. | |
| 2018/0321567 A1 * | 11/2018 | Orillard | C03C 17/225 |

FOREIGN PATENT DOCUMENTS

WO    WO 2011/161110 A1    12/2011

OTHER PUBLICATIONS

International Search Report as issued in International Patent Application No. PCT/FR2020/052582, dated May 14, 2021.

* cited by examiner

*Primary Examiner* — Stephone B Allen
*Assistant Examiner* — Tamara Y. Washington
(74) *Attorney, Agent, or Firm* — Pillsbury Winthrop Shaw Pittman LLP

(57) ABSTRACT

An optical system includes an optical assembly including a substrate having two opposite main faces and an electrochemical functional device with electrically controllable optical and/or energetic properties formed on a main face, this optical assembly having an initial color state with an initial color value in reflection at a first reflection angle, a coating for controlling color in reflection formed on the other main face and forming an external face of the system, the optical system having a final color state with a final color value in reflection at this first angle, this final color state (Continued)

being closer than the initial color state to a reference color state having a reference color value at the first angle, this corresponding to a variation in color distance between the initial and reference values, and between the final color and the reference values smaller than 0 at the first angle.

20 Claims, 5 Drawing Sheets

[Fig.1]
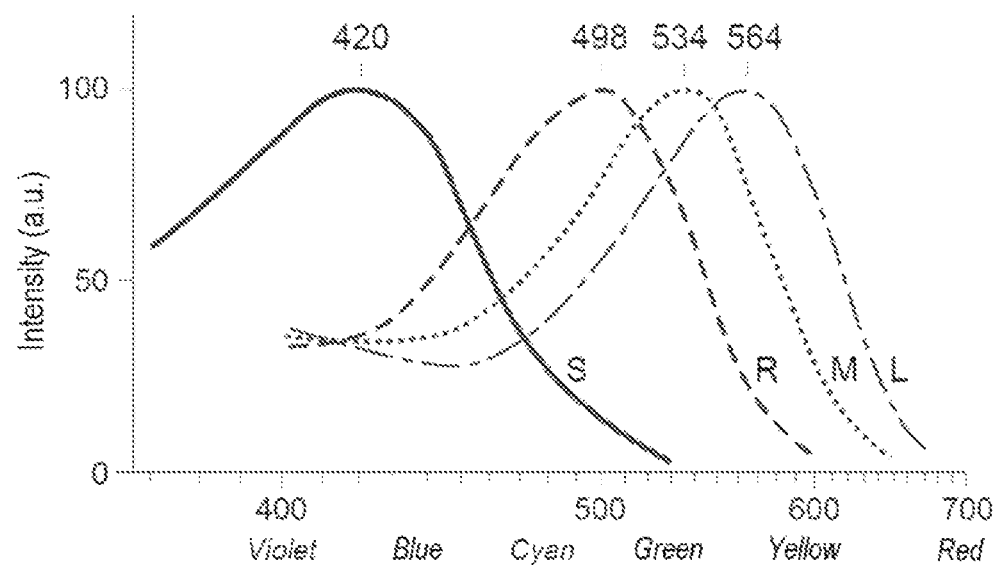
[Fig.2]
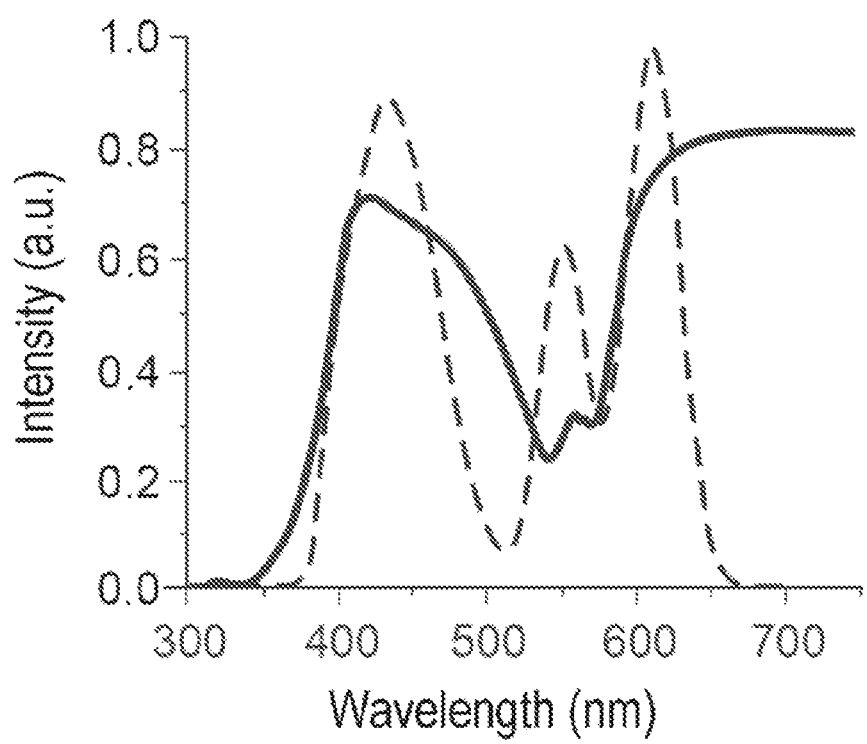

[Fig.3]
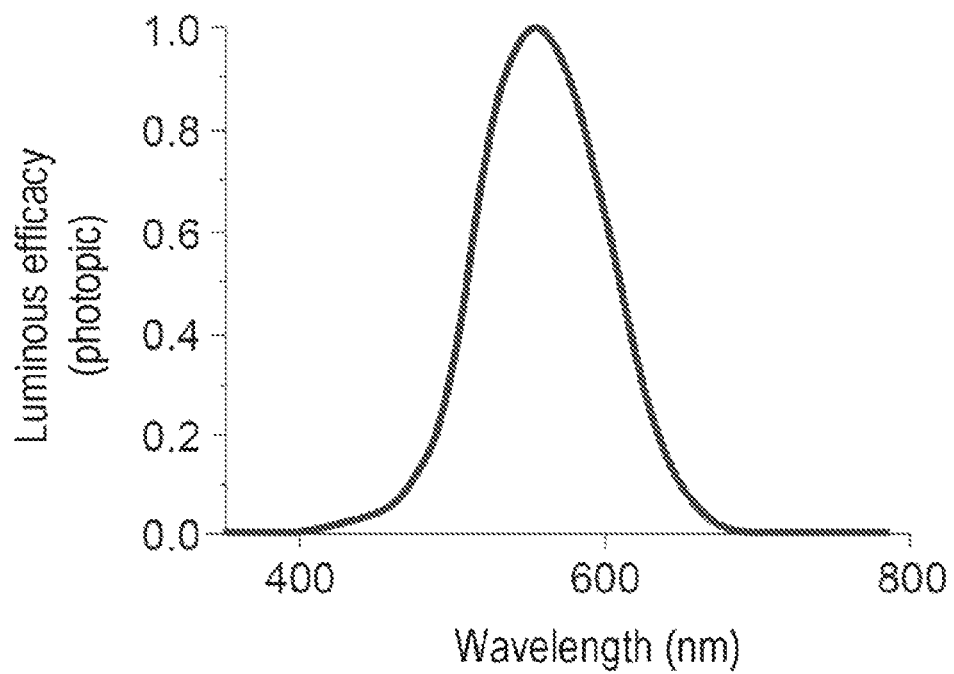
[Fig.4]
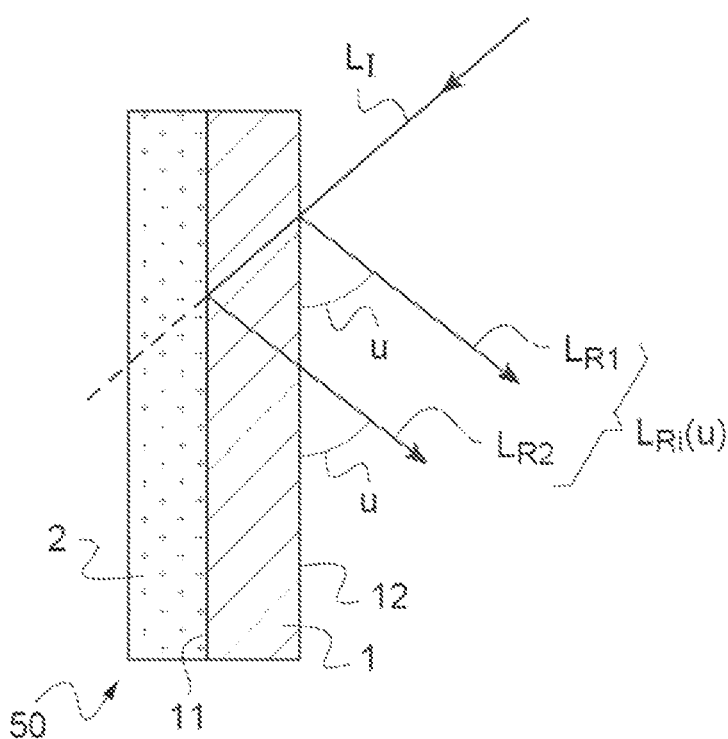

[Fig.5]
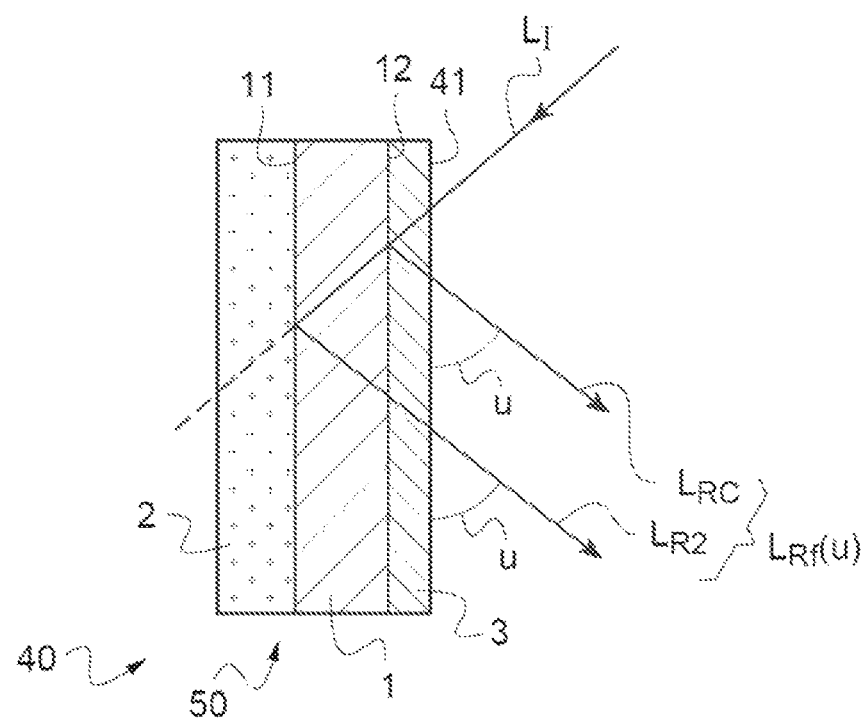
[Fig.6]
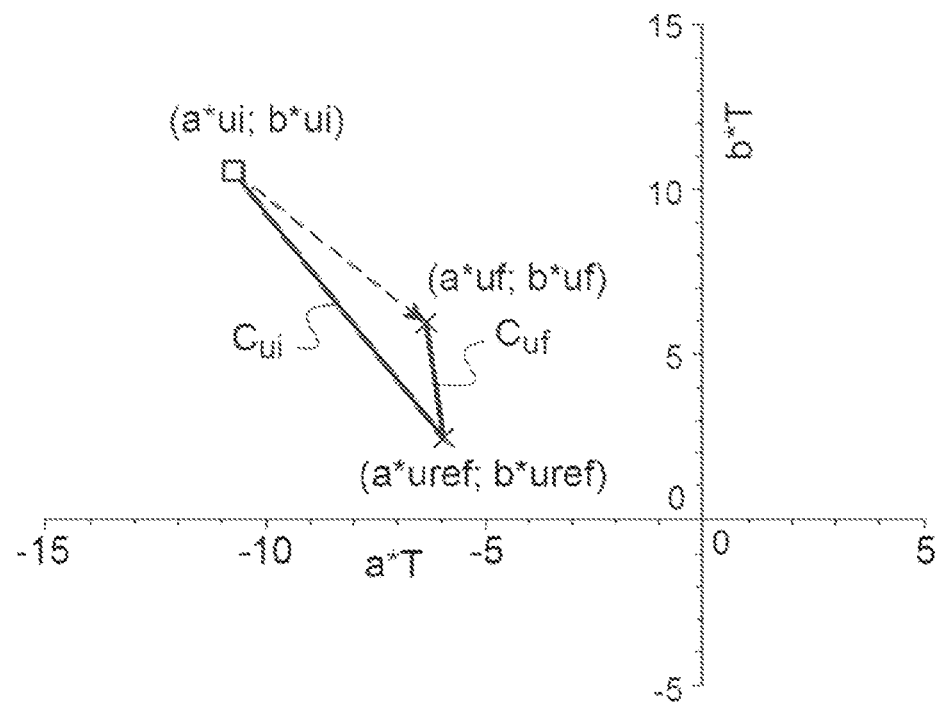

[Fig.7]
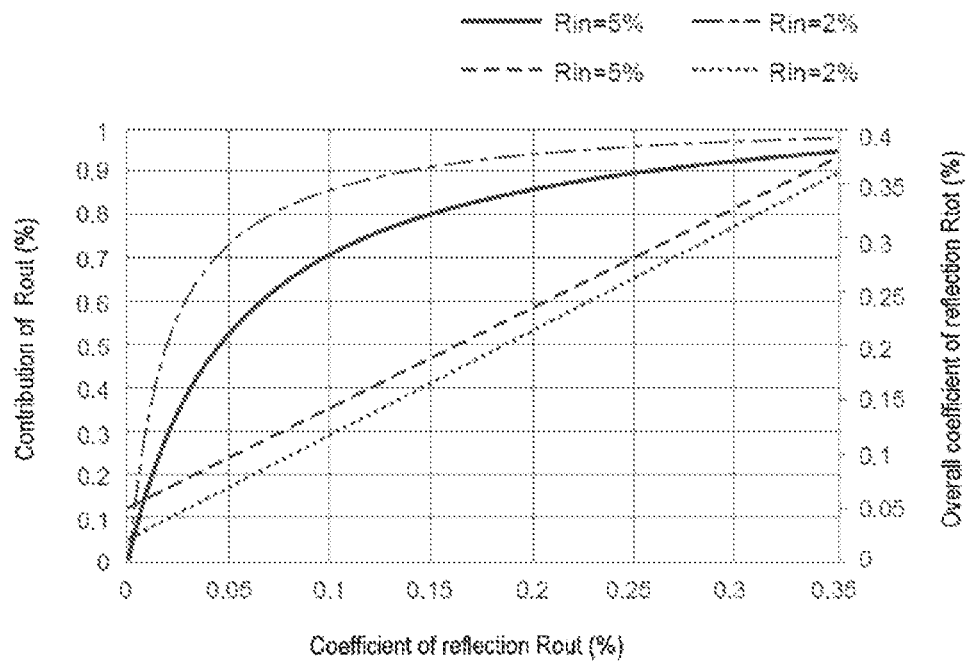
[Fig.8]
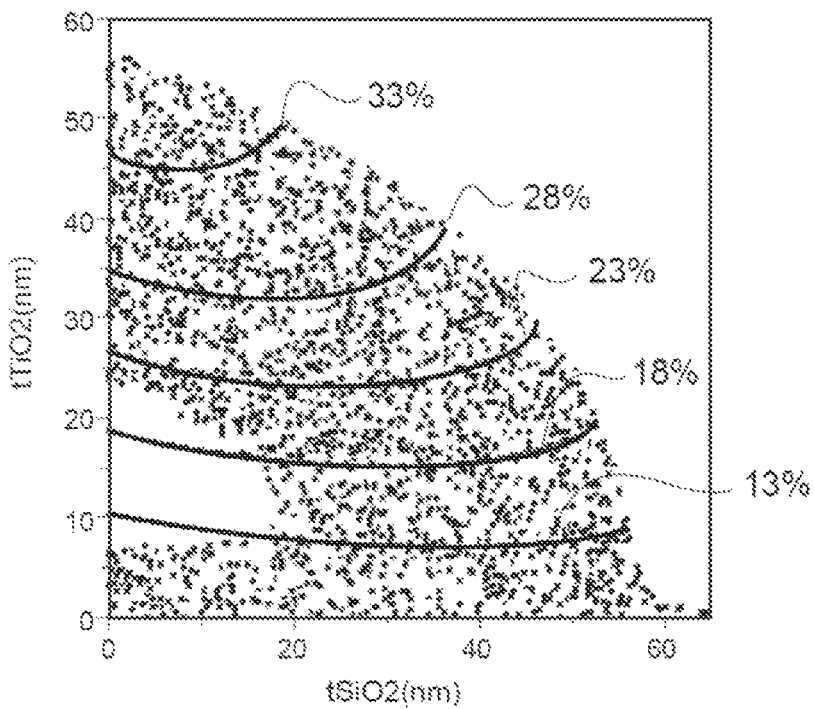

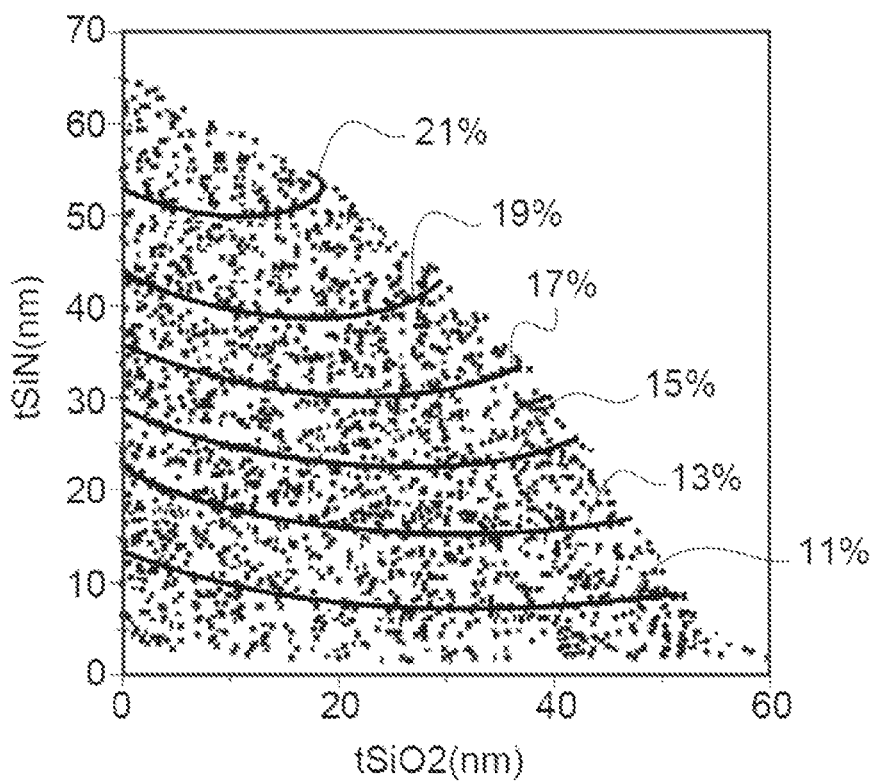
[Fig.9]

OPTICAL SYSTEM WITH AN ELECTROCHEMICAL FUNCTIONAL DEVICE HAVING ELECTRICALLY CONTROLLABLE OPTICAL AND/OR ENERGETIC PROPERTIES AND A COATING FOR CONTROLLING COLOUR IN REFLECTION, AND ASSOCIATED PROCESSES

CROSS-REFERENCE TO RELATED APPLICATIONS

This application is the U.S. National Stage of PCT/FR2020/052582, filed Dec. 21, 2020, which in turn claims priority to French patent application number 1915568 filed Dec. 24, 2019. The content of these applications are incorporated herein by reference in their entireties.

The present invention relates to an optical system comprising a coating for controlling color in reflection and an electrochemical functional device with electrically controllable optical and/or energetic properties, i.e. a device of the type commonly referred to as an "electrochromic device".

Said optical system may be obtained using a method for modifying the color observed in reflection from an optical assembly of this optical system.

Electrochromic devices have certain characteristics that may be modified, under the effect of a suitable supply of electrical power, between a clear state and a tinted state, these characteristics most particularly being transmittance, absorbance and/or reflectance at certain wavelengths of the electromagnetic spectrum, in particular in the visible and/or in the infrared, or even the scatter of light. The variation in transmittance generally occurs in the optical (infrared, visible, ultraviolet) domain and/or in other domains of the electromagnetic spectrum, hence the denomination device with variable optical and/or energetic properties, the optical domain not necessarily being the only domain in question.

From the thermal point of view, glazings the absorbance of which may be modified in at least some of the solar spectrum allow the solar load inside rooms or cabins/compartments to be controlled when they are installed as exterior architectural glazings or windows of means of transport such as automobiles, trains and airplanes, and excessive heating thereof in case of high insolation to be avoided.

From the optical point of view, these devices allow the degree of vision to be controlled, this allowing, when they are installed as exterior glazings, glare in case of high insolation to be avoided. They may also have a particularly advantageous shutter effect, both when used as exterior glazings and when used as interior glazings, for example as part of interior partitions between rooms (offices in a building) or to isolate compartments in trains or airplanes for example.

In this context, it is known to employ an optical system incorporating an electrochromic device formed on a substrate. Despite their advantageous properties, optical systems provided with electrochromic devices have the drawback of having a color in reflection. This color is mainly due to the reflection of incident light from the interface between the electrochromic device and an adjacent layer—substrate, or intermediate layer placed between the electrochromic device and the substrate of the electrochromic device.

Furthermore, a second drawback associated with the use of these devices is that this color observed in reflection varies depending on the reflection angle and therefore depending on the angle of observation.

Lastly, small nonuniformities in the thicknesses of the layers of the electrochromic stack may lead to large nonuniformities in reflected color.

To mitigate these drawbacks, a glazing equipped with an electrochromic device deposited on a substrate, this same substrate being laminated, using a polyvinyl-butyral (PVB) layer with a counter-substrate, has been described in the prior art. A reflection-modifying layer is interposed between the PVB and the counter-substrate. This addition is complex and requires the use of a complex arrangement (lamination) of layers for carrying and holding the modifying layer.

More precisely, the visual perception of color involves three psycho-sensorial parameters corresponding to the subjective sensations of hue, saturation and brightness. Hue is defined by the words blue, green, red, etc. Saturation expresses the degree of colorfulness, as opposed to the amount of white radiation perceived in the colored radiation; the lower the saturation of a color the whiter it appears. Brightness or lightness is an achromatic factor that relates to the value of the colored stimulus. It varies from a maximum non-dazzling value to the absence of light (black). It should be readily understood that, by varying these three parameters independently of one another, it is possible to produce any imaginable sensation of color. In this context, the various systems for describing a color, for example the CIE 1931 and CIELAB 76 color spaces, are merely different ways of defining the three parameters that describe said color.

In the human eye, these sensations of color are described by "integral quantities". In this respect, perceived color, which is a notion encompassing both hue and saturation, is the combination of three signals corresponding to three types of color-sensitive photoreceivers present in the retina, these photoreceivers being called cones. Such as illustrated in FIG. 1, each type of cone has a spectral sensitivity that is specific thereto. The color of an object may therefore be entirely described via quantities expressing the excitation of each of these cones. The excitation of a cone is the integral of the spectral intensity of the light that reaches it as a function of the spectral sensitivity of the cone. Thus, if the blue cone is two times more sensitive at 420 nm than at 450 nm, then incident light of 1 mW/cm$^2$ at 420 nm creates the same excitation as incident light of 2 mW/cm$^2$ at 450 nm. Provided that the same excitation of the cones is created, the same color is perceived, even if the spectral distribution of the light is different. By way of example, the two spectra shown in FIG. 2 cause the same color to be perceived by a human being, since they cause the same excitation for each cone. For a given color, it is therefore possible to identify an infinite number of spectra capable of producing it.

The same principles are applied to the description of the sensation of light intensity. In this case, photoreceivers called rods are also involved. An overall sensitivity to light intensity has been determined for an average human eye. Such as illustrated in FIG. 3, the maximum sensitivity of the human eye is obtained for electromagnetic radiation of a wavelength of 550 nm, this corresponding to the wavelength of the hue "green". In this context, light reflectance designates average reflectance weighted by a curve of luminous efficacy describing human sensitivity. Light reflectance is therefore an integral value measuring reflectance as perceived by a human eye, for a given amount of incident light. The value of this light reflectance may differ significantly from one reflection spectrum to the next, even though these spectra allow the same color in reflection to be obtained.

In the rest of the text and for descriptive purposes, the visual appearance of the color in reflection and the light-reflectance values are measured according to standard NF EN 410, which is commonly used when determining luminous and solar characteristics of glass in buildings. Alternatively, these data may also be measured according to other known experimental protocols without however departing from the essence of the invention.

There is therefore a need to provide an optical system equipped with an electrochromic device the color in reflection of which may be controlled in a simple, effective and reliable manner.

More particularly, according to the invention an optical system is proposed comprising:
- an optical assembly comprising a glazing-function substrate equipped with two opposite main faces and an electrochemical functional device with electrically controllable optical and/or energetic properties formed on one of these two main faces, this electrochemical functional device comprising at least one electrochromic stack equipped with:
- a first transparent conductive layer,
- a working electrode arranged above said first transparent conductive layer,
- a counter-electrode arranged above said working electrode,
- a second transparent conductive layer arranged above said counter-electrode,
- lithium ions introduced into said electrochromic stack,
- and, preferably, a separate layer of an ionic conductor, which layer is intermediate between the electrode and the counter-electrode, this optical assembly having an initial color state with an initial color value (L*ui; a*ui; b*ui) in reflection at a first reflection angle (u) on the side of the substrate,
- a coating for controlling color in reflection, said coating being formed on the other main face of the substrate and forming an external face of said optical system, and being such that the optical system has a final color state with a final color value (L*uf; a*uf; b*uf) in reflection at this first reflection angle (u), this final color state being closer than the initial color state to a reference color state having a reference color value (L*uref; a*uref; b*uref) at said first reflection angle (u), this corresponding to a variation ΔCu in color distance (Cui, Cuf) between the initial color value and the reference value, on the one hand, and between the final color value and the reference value, on the other hand, smaller than 0 at said preset first reflection angle (u), i.e.

$$\Delta Cu = Cuf - Cui$$
$$= \sqrt{(a*uf - a*uref)^2 + (b*uf - b*uref)^2}$$
$$- \sqrt{(a*ui - a*uref)^2 + (b*ui - b*uref)^2} < 0.$$

Thus, advantageously, according to the invention, the obtained optical system has a controlled color in reflection. The initial color of the optical assembly formed by the electrochromic device and the substrate, which color is given by the reflection of the incident light from the interface between the electrochromic device and the adjacent layer, is controllably modified by the coating that forms the external face of the optical system.

This external face of the optical system is a face on which no other layer is arranged. As described in detail below, when the optical system is incorporated into a glazing, this external face may in particular be exposed to the exterior environment of the glazing or be comprised inside a glazing of double-glazing or triple-glazing type.

Specifically, the color in reflection of the coating may be controlled so that the overall reflection of light by the optical system, which reflection in particular comprises a component reflected from the coating, has a final color at a given reflection angle, this final color being closer to a desired reference color than the initial color.

The coating forms the external face of the optical system and hence it is not necessary to provide a counter-substrate to cover this coating or to employ a complex manufacturing process to sandwich the coating between two other layers of the overall optical system.

It is thus possible to control the color of the reflection from the optical system according to the invention in a simple, effective and rapid manner. This color may thus be neutralized or modified so as to be located in a range of desired target colors. Furthermore, the reflection from the coating allows nonuniformities in color related to nonuniformities in the thicknesses of the layers of the electrochromic stack to be attenuated. Lastly, it is possible to modify the color of the reflection so as to decrease the observed variation in color with reflection angle.

Advantageously, the color-controlling coating may be applied to a substrate of any nature and of any thickness, whether tempered beforehand or not. It is preferably applied to an untempered substrate. It may be applied to a substrate having any optical characteristics with respect to transmission, and in particular to a tinted or untinted substrate.

The following are other advantageous and nonlimiting features of the optical system according to the invention:
- an overall reflection of light from the optical system at the first reflection angle u comprising at least one light beam reflected by the color-controlling coating, the spectrum of this reflected light beam comprises at least one spectral component located in at least one effective range [λmin; λmax] of reflection wavelengths, said effective range [λmin; λmax] of reflection wavelengths being defined so that a variation in reflection by the optical assembly of any amount of light at a wavelength λ comprised in said effective reflection range [λmin; λmax] engenders a variation ΔCu(λ) in color distance (Cui, Cu(λ)) smaller than 0 at said first reflection angle u, where:

$$\Delta Cu(\lambda) = Cu(\lambda) - Cui$$
$$= \sqrt{(a*u(\lambda) - a*uref)^2 + (b*u(\lambda) - b*uref)^2}$$
$$- \sqrt{(a*ui - a*uref)^2 + (b*ui - b*uref)^2}$$

with (a*ui; b*ui) the initial color coordinates of the initial color value in reflection at the first reflection angle u,
Cui the color distance between these initial color coordinates (a*ui; b*ui) and the color coordinates of said reference color value in reflection (a*uref; b*uref) at this first reflection angle u,
(a*u(λ); b*u(λ)) the color coordinates of the color value in reflection at the first reflection angle u obtained following the reflection variation at said wavelength λ,
Cu(λ) the color distance between these color coordinates (a*u(λ); b*u(λ)) and the color coordinates of said reference color value in reflection (a*uref; b*uref) at the first reflection angle u;
the light intensity of the spectral components of the beam reflected by the color-controlling coating and that are comprised in said effective range [λmin; λmax] of reflection wavelengths make up at least 50%, preferably at least 55'%, preferably at least 60%, preferably at least 65%, and preferably at least 70% of the total light intensity of the beam reflected by said color-controlling coating;

the initial color state of the optical assembly having an initial color value (a*vi; b*vi) in reflection at a second reflection angle v that is different from the initial color value (a*ui; b*ui) in reflection at the first reflection angle u, an initial color distance is defined between said initial color value (a*ui; b*ui) observed at said first reflection angle u and the initial color value (a*vi; b*vi) observed at said second reflection angle v, the coating for controlling color in reflection is such that the optical system has a final color state with a final color value (a*vf; b*vf) in reflection at this second reflection angle v, a final color distance between said final color value (a*uf; b*uf) observed at said first reflection angle u and the final color value (a*vf; b*vf) observed at the second reflection angle v being smaller than said initial color distance, this corresponding to a variation ΔCang(u,v) in color distance (Cang(u,v)i, Cang(u,v)f) between the initial color distance between the initial color values at said first and second reflection angles, on the one hand, and the final color distance between the final color values at said first and second reflection angles, on the other hand, smaller than 0, i.e.

$$\Delta Cang(u, v) = Cang(u, v)f - Cang(u, v)i$$
$$= \sqrt{(a*uf - a*vf)^2 + (b*uf - b*vf)^2}$$
$$- \sqrt{(a*ui - a*vi)^2 + (b*ui - b*vi)^2} < 0;$$

said color-controlling coating makes direct contact with said substrate;

said color-controlling coating comprises at least one layer of a material having reflection properties such that a light beam reflected by this coating has a variation in color value as a function of the angle of reflection and/or a preset color state lower than a preset threshold value;

the preset color state of the light beam reflected by the coating for controlling color in reflection is such that a* and b* are strictly lower than zero at least in a preset range of reflection angles;

said color-controlling coating comprises at least one layer of thickness comprised between 1 and 100 nanometers of at least one material from the following:

MOx with x between 1 and 3 and preferably between 1.5 and 2.5, M being one of the following compounds: Si, Ti, Zr, Hf, Sn;

NbOx with x between 1.5 and 3.5 and preferably between 2 and 3;

MNx with x between 0 and 2 and preferably between 0.5 and 1.5, M being one of the following compounds: Nb, Ti, Zr, Hf;

SiNx with x between 0.7 and 2 and preferably between 1 and 1.7;

SnNx with x between 0 and 1.5 and preferably between 0.3 and 1;

MOxNy with x between 0 and 2.2 and y between 0 and 1.2, M being one of the following compounds: Ti, Zr, Hf;

MOxNy with x between 0 and 2.2 and y between 0 and 1.5, M being one of the following compounds: Si, Sn;

NbOxNy with x between 0 and 2.7 and y between 0 and 1.2;

M1M2aOxNy with a between 0 and 1, x between 0 and 4.4, y between 0 and 2.4, M1 and M2 being one of the following compounds: Ti, Zr, Hf;

SnZnaOx with a between 0 and 1.2 and x between 0 and 3.5, and preferably between 1.8 and 3.2;

said color-controlling coating comprises at least one layer of thickness comprised between 1 and 100 nanometers of at least one material from the following SiO2, TiO2, Nb2O5, Si3N4, ZrO2, TiZrO4, SnO2, SnZnO3, TiN, NbN, SiOxNy, HfO2, HfN, SnN, TiOxNy, NbOxNy, TiZrOxNy;

at least 20%, preferably at least 301, preferably at least 40%, preferably at least 50%, preferably at least 60%, preferably at least 70%, and preferably at least 80% of the total light intensity of the overall reflection from the optical system at the reflection angle u is due to reflection from said color-controlling coating.

The invention also relates to a method for modifying the color intended to be observed by an observer in reflection of an optical assembly for forming an optical system, said optical assembly comprising a glazing-function substrate equipped with two opposite main faces and an electrochemical functional device with electrically controllable optical and/or energetic properties formed on one of these two main faces of the substrate, this electrochemical functional device comprising at least one electrochromic stack equipped with:

a first transparent conductive layer, a working electrode arranged above said first transparent conductive layer, a counter-electrode arranged above said working electrode, a second transparent conductive layer arranged above said counter-electrode, lithium ions introduced into said electrochromic stack, and, preferably, a separate layer of an ionic conductor, which layer is intermediate between the electrode and the counter-electrode, said method modifying the color from an initial color state having an initial color value (L*ui; a*ui; b*ui) observed at a preset first reflection angle u to a final color state having a final color value (L*uf; a*uf; b*uf) observed at this first reflection angle u, this final color state being closer than the initial color state to a reference color state having a reference color value (L*uref; a*uref; b*uref) at said first reflection angle u, said method comprising at least one step of modifying reflection properties by arranging a coating for controlling color in reflection on the other main face of the substrate of said optical system, so that a variation ΔCu in color distance (Cui, Cuf) between the initial color value and the reference color value, on the one hand, and between the final color value and the reference color value, on the other hand, is smaller than 0 at said first reflection angle u, i.e.

$$\Delta Cu = Cuf - Cui$$
$$= \sqrt{(a*uf - a*uref)^2 + (b*uf - b*uref)^2}$$
$$- \sqrt{(a*ui - a*uref)^2 + (b*ui - b*uref)^2} < 0.$$

Thus, by virtue of the method according to the invention, it is possible to easily obtain an optical system according to the invention by modifying the color of a given optical assembly.

Advantageously, said initial color state having an initial color distance between said initial color value (L*ui; a*ui; b*ui) observed at said first reflection angle u and an initial color value (L*vi; a*vi; b*vi) observed at a second reflection angle v, said method comprises at least one other step of modifying reflection properties of the external face of said optical assembly so that a variation ΔCang(u,v) in color distance (Cang(u,v)i, Cang(u,v)f) between the initial color distance between the initial color values at said first and second reflection angles, on the one hand, and the final color distance between the final color values at said first and second reflection angles, on the other hand, is smaller than 0, i.e.

$$\Delta Cang(u, v) = Cang(u, v)f - Cang(u, v)i$$
$$= \sqrt{(a*uf - a*vf)^2 + (b*uf - b*vf)^2}$$
$$- \sqrt{(a*ui - a*vi)^2 + (b*ui - b*vi)^2} < 0.$$

The invention also relates to a process for manufacturing an optical system such as described above.

The invention also relates to the use of an optical system such as described above as an architectural glazing, in particular an exterior internal-partition or glazed-door glazing, as a glazing with which internal partitions or windows of means of transport such as a train, airplane, automobile or boat is equipped, as a glazing in display screens such as computer screens or TV screens, or in camera objectives or to protect solar panels.

The following description, which is given with reference to the appended drawings, which are given by way of nonlimiting examples, will allow of what the invention consists and how it may be carried out to be clearly understood.

In the appended drawings:

FIG. 1 is a graph illustrating the spectral sensitivity of the photosensitive rods and cones present in a human eye, FIG. 2 is a graph showing two light spectra leading to the observation of a color of same chroma, FIG. 3 is a graphical representation of the sensitivity of the human eye as a function of the wavelength of incident radiation, FIG. 4 is a partial cross-sectional view of an optical assembly comprising a glazing-function substrate and an electrochromic stack, FIG. 5 is a partial cross-sectional view of an optical system according to the invention comprising the optical assembly of FIG. 1 and a coating for controlling color in reflection, and FIG. 6 is a graph illustrating, in a CIE L*a*b* color space, the modification of the color in reflection of the optical assembly of FIG. 1 according to one particular embodiment of the invention, FIG. 7 is a graph illustrating the variation in the overall coefficient of reflection Rtot of light from the optical system according to the invention as a function of the coefficient of reflection Rout of light from the coating for controlling color in reflection, and the variation in the contribution of this coefficient of reflection Rout of light from the coating for controlling color in reflection to the overall reflection of light from the optical system as a function of the coefficient of reflection Rout of light from the coating for controlling color in reflection and for various values of the coefficient of reflection of light from the interface between the substrate and the electrochromic stack, FIG. 8 is a graph showing pairs of thicknesses of TiO2 and SiO2 for forming a color-controlling coating suitable for generating, when deposited on a SageGlass® glazing, a shift in color such that the color coordinates a* and b* in the CIELAB system of the optical assembly in reflection are negative with an angular dependence C* (0°-60°) lower than 5, and indicating the coefficient of reflection of this coating deposited on this same substrate, FIG. 9 is a graph showing pairs of thicknesses of SiN and SiO2 for forming a color-controlling coating suitable for generating, when deposited on a SageGlass' glazing, a shift in color such that the color coordinates a* and b* in the CIELAB system of the optical assembly in reflection are negative with an angular dependence C*(0°-60°) lower than 5, and indicating the coefficient of reflection of this coating deposited on this same substrate.

By way of preliminary remarks, it will be noted that, in all the figures, identical or similar elements of these various embodiments of the invention have been referenced with the same reference signs and are not described each time.

A plurality of particular embodiments of the invention are described below. It will be understood that the present invention is in no way limited by these particular embodiments and that other embodiments may perfectly well be employed.

As illustrated in FIG. 5, the invention relates to an optical system 10 comprising at least the following optical elements:

an optical assembly 50 comprising a glazing-function substrate 1 equipped with two opposite main faces 11, 12 and an electrochemical functional device with electrically controllable optical and/or energetic properties formed on one 11 of these two main faces, and a coating 3 for controlling color in reflection, said coating being formed on the other main face 12 of the substrate 1 and forming an external face 41 of said optical system 40.

Here, the electrochemical functional device comprises at least one electrochromic stack 2 equipped with:

a first transparent conductive layer, a working electrode arranged above said first transparent conductive layer, a counter-electrode arranged above said working electrode, a second transparent conductive layer arranged above said counter-electrode, lithium ions introduced into said electrochromic stack, and preferably, a separate layer of an ionic conductor, which layer is intermediate between the electrode and the counter-electrode.

The arrangement of a layer "above" or "below" another does not necessarily mean here that these two layers make direct contact with one another. The terms "above" and "below" here refer to the order of arrangement of these various elements, which is chosen arbitrarily with respect to the glazing-function substrate. Alternatively, such an arrangement order may therefore be reversed, with respect to this same substrate. In addition, two layers deposited one above the other may for example be physically separated by one or more intermediate layers. In the same spirit, the term "between" does not necessarily mean that three designated elements make direct contact with one another. Similarly, the expression "formed on" is used to express the fact that a layer is placed on a given side of another layer. This expression does not imply that the layer in question is formed "directly" on the other layer. Other intermediate layers may be arranged between said layer and the other layer.

From a structural point of view, and as known, the electrochromic stack comprises the two electrodes intermediate between the two transparent electrically conductive layers. At least one of these electrodes is made of an electrochromic material that, by definition, is suitable for reversible and simultaneous intercalation of ions and electrons, the oxidation states corresponding to the intercalated and de-intercalated states being of different tints, one of the states having a higher light transmittance than the other. The intercalation or de-intercalation reaction is controlled by means of the two transparent conductive layers, the electrical power supply of which is provided by a current generator or a voltage generator.

The working electrode is made of a cathodic electrochromic material suitable for capturing ions when a voltage is applied across the terminals of the electrochromic system. The tinted state of the working electrode corresponds to its most reduced state.

Symmetrically with respect to the working electrode, reversible intercalation of cations into the counter-electrode is also possible. In other words, this counter-electrode is thus able to cede ions when a voltage is applied across the terminals of the electrochromic system. This counter-electrode is a layer of neutral color, or at the very least a layer that is not highly colored when the working electrode is in the clear state, and preferably has a color in the oxidized state such as to increase the total contrast of the electrochromic stack, between its tinted state and its clear state.

The working electrode and the counter-electrode are separated by an interface region commonly called the "electrolyte" (but also known as the ion-conductor (IC)) which has a dual, ion-conductor and electrical-insulator function. The ion-conductor layer therefore prevents any short-circuit between the working electrode and the counter-electrode. It in addition allows the two electrodes to hold a charge and thus keep their clear and tinted states.

According to one particular embodiment, the ion-conductor layer is formed by deposition between the working electrode and the counter-electrode of a separate intermediate layer. The limits between these three layers are defined by abrupt changes in composition and/or in microstructure. Such electrochromic stacks therefore have at least three separate layers separated by two separate abrupt interfaces. The ion-conductor layer may take the form of a gelled solution and/or of an ionically conductive polymer and/or of one or more mineral layers deposited by magnetron cathode sputtering, CVD or a sol-gel process.

Alternatively, the working electrode and the counter-electrode are deposited one above the other and generally in contact with each other, and a transition region having an electrolyte function is formed only subsequently, via migration of components within the electrodes during the manufacturing process and in particular during phases of heating the stack.

Said first and second transparent conductive layers of the electrochemical functional device may include one or more transparent conductive coatings such as coatings of $SnO_2:F$ or ITO.

Preferably, here, the electrochromic stack 2 makes direct contact with said substrate 1.

As a variant, one or more intermediate layers may be arranged between the substrate 1 and the electrochromic stack 2.

The glazing-function substrate may in particular be made of any material suitable for glazing manufacture. It may in particular be a question of a vitrified material, of glass or of a suitable plastic.

The substrate may or may not be tempered. It may have any thickness. It may have any optical characteristic; in particular it may or may not be tinted.

Preferably, the color-controlling coating 3 makes direct contact with said substrate 1 and defines the external face 41 of the optical system 40.

As a variant, one or more intermediate layers may be arranged between the substrate 1 and the coating 3.

The coating 3 in all cases forms the external face 41 of the optical system 40.

The optical system according to the invention is particularly advantageous in the context of development of an optical system that will be tempered after deposition of the electrochromic stack 2 and of the coating 3. The coating 3 is then preferably able to withstand the temper.

The optical system also preferably comprises an electrochromic stack able to withstand the tempering steps. A layer for protecting the electrochromic stack may optionally be added.

The color or color state of the optical assembly 50 or of the optical system 40 will, below, be described using the known CIE $L^*a^*b^*$ color space (commonly called the CIE LAB color space) in which:

the component $L^*$ is the lightness, and is measured from 0 (black) to 100 (white), the component $a^*$ represents a range of 600 levels on an axis ranging from the color green (−300) to the color red (+299), the component $b^*$ represents a range of 600 levels on an axis ranging from the color blue (−300) to the color yellow (+299).

The components $a^*$ and $b^*$ of such a color space are for example shown in FIG. 6.

The optical assembly 50 comprising the substrate 1 and the electrochemical functional device has an initial color state with an initial color value ($L^*ui$; $a^*ui$; $b^*ui$) in reflection at the reflection angle u on the side of the substrate. This optical assembly 50 is schematically shown in FIG. 4. The coordinates ($a^*ui$; $b^*ui$) are the initial color coordinates of the initial color value in reflection of the optical assembly 50 at the reflection angle u.

A light beam LI incident on the optical assembly 50 from the side of the substrate 1 is partially reflected. The overall reflection of this incident beam comprises a light beam LRi(u) reflected at the angle u.

This light beam LRi(u) reflected at the angle u mainly comprises a component LR1 reflected from the air/substrate interface, i.e. from an external face of the optical assembly 50, and a component LR2 reflected from the interface between the electrochromic functional device and the substrate 1. The light beam LRi(u) reflected at the angle u has an initial spectrum SI.

The optical system 40 according to the invention has a final color state with a final color value (L*uf; a*uf; b*uf) in reflection at this reflection angle u. The coordinates (a*uf; b*uf) are the final color coordinates of the final color value in reflection of the optical system 40 at the reflection angle u.

The light beam LI incident on the optical system 40 from the side of the coating 3 is partially reflected. The overall reflection of this incident beam comprises a light beam LRf(u) reflected at the angle u.

This light beam LRf(u) reflected at the angle u comprises a component LRC reflected from the color-controlling coating 3. Because of the nanoscale thickness of this coating 3, it is commonly accepted that this coating 3 will cause only one reflection. It furthermore comprises the component LR2 reflected from the interface between the electrochromic functional device and the substrate 1.

The light beam LRf(u) reflected at the angle u has a final spectrum SF.

Noteworthily, the final color state of the optical system 40 is closer than the initial color state of the optical assembly 50 to a reference color state having a reference color value (L*uref; a*uref; b*uref) at said reflection angle u.

Generally, the chosen reference color value (a*uref; b*uref) corresponds to a particular color to be obtained in reflection, for reasons of technical and/or esthetic nature. The coordinates (a*uref; b*uref) are the reference color coordinates of the reference color value in reflection of the optical assembly 50 at the reflection angle u.

In the CIELAB color space, the initial color distance Cui between the initial color coordinates (a*ui; b*ui) and the reference color coordinates (a*uref; b*uref) at the reflection angle u respects the following equation:

$$Cui = \sqrt{(a^*ui - a^*uref)^2 + (b^*ui - b^*uref)^2}.$$

The final color distance Cuf between the final color coordinates (a*uf; b*uf) and the reference color coordinates (a*uref; b*uref) at the reflection angle u respects the following equation:

$$Cuf = \sqrt{(a^*uf - a^*uref)^2 + (b^*uf - b^*uref)^2}.$$

Thus, the final color state of the optical system 40 is such that a variation ΔCu in color distance (Cui, Cuf) between the initial color value and the reference color value, on the one hand, and between the final color value and the reference color value, on the other hand, is smaller than 0 at the preset reflection angle u, i.e.

$$\Delta Cu = Cuf - Cui$$
$$= \sqrt{(a*uf - a*uref)^2 + (b*uf - b*uref)^2}$$
$$- \sqrt{(a*ui - a*uref)^2 + (b*ui - b*uref)^2} < 0.$$

Thus, in the example illustrated in FIG. 6, the value measured in the clear state of the initial color (a*ui; b*ui) in reflection of an optical assembly 50 is (−10.4805; 10.9183), this corresponding to a yellow-green color. This value has here been represented by a square. It will be noted that in other embodiments, this initial color value (a*ui; b*ui) in reflection at the reflection angle u may be any value of the entire visible spectrum, without departing from the spirit of the invention.

The reference color value relates to a reference color that it is sought to obtain. It differs from the "final color" of the optical system 40 in reflection at the angle u, which corresponds to the final color value (a*uf; b*uf). It here depends on the initial color value of the optical assembly in reflection at the angle u and on the color value of the coating 3, i.e. the color in reflection of this coating.

The initial color distance Cui corresponds to the norm of the vector extending from the initial color point (a*ui; b*ui) to the chosen reference color point (a*uref; b*uref) in the color space shown in FIG. 6.

Similarly, the final color distance Cuf corresponds to the norm of the vector extending from the final color point (a*uf; b*uf) to the chosen reference color point (a*ref; b*ref) in the color space shown in FIG. 6.

In the example more particularly described here, the reference color value (a*ref; b*ref) corresponds to a green-blue color. However, according to other embodiments, this reference color value (a*ref; b*ref) in reflection at the reflection angle u may be any value of the entire visible spectrum, without departing from the spirit of the invention.

Preferably, at least 20%, preferably at least 30%, preferably at least 40%, preferably at least 50%, preferably at least 60%, preferably at least 70%, and preferably at least 80% of the total light intensity of the overall reflection from the optical system 40 at the reflection angle u is due to reflection by said color-controlling coating 3.

In other words, the light beam LRC reflected by the coating 3 is preferably the main component of the overall light beam reflected by the optical system 40.

Consequently, nonuniformities in reflected color due to small variations in thicknesses in the electrochromic stack are thus limited.

Furthermore, by suitably choosing the optical characteristics of the coating, so that the reflection from this coating forms most of the reflected beam, it is possible, on the one hand, to give the optical system a preset color in reflection, and, on the other hand, to limit variations as a function of reflection angle in the colors reflected.

Even with a low coefficient of reflection in air, the coating 3 may allow the color observed in reflection to be modified if it is sufficiently colored.

FIG. 7 shows a graph illustrating, on the one hand, the variation in the overall coefficient of reflection Rtot of light from the optical system 40 according to the invention as a function of the coefficient of reflection Rout of light from the coating 3 for controlling color in reflection, and, on the other hand, the variation in the contribution of this coefficient of reflection Rout of light from the coating 3 for controlling color in reflection to the overall reflection of light from the optical system 40 as a function of the coefficient of reflection Rout of light from the coating 3 for controlling color in reflection. These representations have been shown for various values of the coefficient of reflection Rin of light from the interface between the substrate 1 and the electrochromic stack 2.

Here, the overall coefficient of reflection Rtot is defined as the ratio of the intensities of the reflected light beam LRf and of the incident light beam LI.

Here, the coefficient of reflection Rout of light from the coating 3 for controlling color in reflection is defined as the ratio of the intensities of the light beam LRC reflected by the coating 3 and of the incident light beam LI.

The coefficient of reflection Rin of light from the interface between the substrate and the electrochromic stack is defined as the ratio of the intensities of the light beam LR2 reflected by this interface and of the incident light beam LI.

In the absence of the coating 3, the coefficient of reflection from the air/substrate interface is about equal to 4% and the reflection is colorless. The coordinates (a*ui, b*ui) are then close to (0, 0). This reflection partially neutralizes the color of the light beam reflected by the interface between the substrate 1 and the electrochromic stack 2.

In the case for example of an optical assembly such as incorporated into a SageGlass® glazing forming the optical assembly 50, the coefficient of reflection Rin at the interface between the substrate 1 and the electrochromic stack 2 was very low, about equal to 2%. Under these conditions, the coefficient of reflection from the coating Rout is equal to 5%, and the total coefficient reflection Rtot is about 7%. The reflection from the coating 3 thus contributes to more than 70% of the total reflection from the optical system 40 formed by the coating 3 and the optical assembly 50.

If the coefficient Rin is higher, for example equal to 5%, the coefficient Rout must be higher than 15%, for a total coefficient of reflection Rtot of about 20%, to ensure a similar contribution.

In the optical system 40 according to the invention, the coefficient of reflection of light at the air/substrate interface is modified by adding the coating 3.

The modification of the light beam LRi(u,λ) reflected by the optical assembly 50 at the reflection angle u, for the wavelength λ, to obtain the beam LRf(u,λ) reflected by the optical system 40 according to the invention, at the reflection angle u, for the wavelength λ, causes the variation ΔCu(λ) in this color distance between the initial color value (a*ui; b*ui) and a color value (a*u(λ); b*u(λ)) in reflection after modification of the reflection at the wavelength λ.

The coordinates (a*u(λ); b*u(λ)) are the color coordinates of the color value in reflection at the reflection angle u obtained following the variation in reflection achieved at said wavelength λ.

The color distance between these color coordinates (a*u(λ); b*u(λ)) and the color coordinates of said reference color value in reflection (a*uref; b*uref) at the reflection angle u is denoted Cu(λ).

This variation in color distance expresses the fact that the color of the optical system 40 in reflection is closer to the desired reference color than the color of the optical assembly 50 without the coating for controlling color in reflection. This variation ΔCu(λ) respects the following equation:

$$\Delta Cu(\lambda) = Cu(\lambda) - Cui$$
$$= \sqrt{(a*u(\lambda) - a*uref)^2 + (b*u(\lambda) - b*uref)^2}$$
$$- \sqrt{(a*ui - a*uref)^2 + (b*ui - b*uref)^2}.$$

To this end, the spectrum of the light beam LRC reflected by the coating 3 for controlling color in reflection at the reflection angle u comprises at least one spectral component located in an effective range ([λmin; λmax]) of reflection wavelengths, said effective range [λmin; λmax] of reflection wavelengths being defined so that a modification of the reflection by the optical assembly 50 of any amount of light at a wavelength λ comprised in said effective reflection range [λmin; λmax] engenders a variation ΔCu(λ) in color distance Cui, Cu(λ) smaller than 0 at the preset reflection angle (u): ΔCu(λ)<0.

Said effective range of reflection wavelengths may in particular comprise a single continuous wavelength range or a plurality of wavelength ranges that are separate from one another. This plurality of wavelength ranges forms an optimal set of wavelength ranges.

Thus, the arrangement of the coating 3 for controlling color in reflection on that main face 12 of the substrate 1 which is opposite the main face 11 on which the electrochromic functional device 2 is formed modifies the spectrum of the overall reflection from the optical assembly 50. More particularly, this spectrum of the overall reflection from the optical assembly 50 is modified to obtain the spectrum of the overall reflection from the optical system according to the invention.

According to one embodiment, at the reflection angle u, the light beam LRC reflected by the coating 3 contains a larger amount of light at at least one wavelength λ comprised in said effective reflection range [λmin; λmax]. This effective reflection range is defined such that the increase in the amount of light reflected at a wavelength comprised in this range causes a variation in the color value at the reflection angle u that brings this value closer to the reference color value. In other words, the increase in the amount of light reflected at a wavelength comprised in this range causes a variation in color observed at the angle u that brings the color of the obtained optical system closer to the reference color.

By "increase in the amount of light" what is meant here is an increase in the light intensity at the wavelength λ in question.

According to another embodiment, at the reflection angle u, the light beams reflected by the coating 3, and in particular the beam LRC reflected by the coating 3, contains a smaller amount of light at at least one wavelength λ comprised in said effective reflection range [λmin; λmax]. This effective reflection range is defined such that the decrease in the amount of light reflected at a wavelength comprised in this range causes a variation in the color value at the reflection angle u that brings this value closer to the reference color value. In other words, the decrease in the amount of light reflected at a wavelength comprised in this range causes a variation in color observed at the angle u that brings the color of the obtained optical system closer to the reference color.

By "decrease in the amount of light" what is meant here is a decrease in the light intensity at the wavelength λ in question.

A negative ΔCu(λ) value expresses a variation in color in reflection at the angle u, at the wavelength λ, after addition of the coating 3 to the optical assembly 50, that allows the initial color to be brought closer to that desired, the obtained color being "closer" to the desired reference color than the initial color. In contrast, the obtainment of a positive ΔCu(λ) value expresses a move away from the desired color, i.e. from the reference color, with respect to the initial color.

With reference to the CIE L*a*b* color space illustrated in FIG. 6, a negative Δa*u value is indicative of a color variation toward the green at the reflection angle u whereas a positive Δa*u value refers to a color variation toward the red at the reflection angle u. Following the same reasoning, a negative Δb*u value is indicative of a color variation toward the blue at the reflection angle u whereas a positive Δb*u value refers to a color variation toward the yellow at the reflection angle u.

Color variations in reflection (Δa*u(λ); Δb*u(λ)) at the reflection angle u may respectively be defined by the following equations:

$$\Delta a*u(\lambda) = a*u(\lambda) - a*ui, \text{ and}$$

$$\Delta b*u(\lambda) = b*u(\lambda) - b*ui.$$

Using these two equations, the equation mentioned above defining $\Delta Cu(\lambda)$, and known values of $a*ui$, $a*uref$, $b*ui$ and $b*uref$, it is easy to compute the variation $\Delta Cu(\lambda)$ in color distance resulting from the addition of the coating 3.

Thus, the effective absorption range [$\lambda min$; $\lambda max$], in which a variation in reflection of any amount of light at a wavelength $\lambda$ comprised in said effective absorption range [$\lambda min$; $\lambda max$] engenders a modification that shifts the initial color at the angle u toward the reference color at the angle u, or, in other words, a variation $\Delta Cu(\lambda)$ in color distance (Cui, Cu($\lambda$)) smaller than 0, will for example be determined.

With regard to the color variations in reflection ($\Delta a*u(\lambda)$; $\Delta b*u(\lambda)$) observed by adding the coating 3 to the optical assembly 50 as a function of the reflection wavelengths, the effective reflection range [$\lambda min$; $\lambda max$] that meets this criterion may be determined.

Preferably, the light intensity of the spectral components of the beam LRC reflected by the color-controlling coating 3 at the reflection angle u and that are comprised in said effective range [$\lambda min$; $\lambda max$] of reflection wavelengths make up at least 50%, preferably at least 55%, preferably at least 60%, preferably at least 65%, preferably at least 70%, preferably at least 75%, preferably at least 80%, preferably at least 85%, and preferably at least 90% of the total light intensity of the beam LRC reflected at the reflection angle u by said color-controlling coating 3.

Thus, the modification of the reflection of the incident light beam is achieved effectively.

A similar condition could also be required for any reflection angle in question.

Moreover, the modification of the reflection of the incident beam by virtue of the color-controlling coating 3 may also allow the angular dependence of the color observed in reflection to be limited.

Thus, the initial color state of the optical assembly 50 generally has an initial color value (a*vi; b*vi) in reflection at another reflection angle v different from the reflection angle u that is different from the initial color value (a*ui; b*ui) in reflection at this reflection angle u. The initial color coordinates (a*vi; b*vi) are the color coordinates of the initial color value in reflection from the optical assembly 50 at the other reflection angle v.

An initial color distance is defined between said initial color value (a*ui; b*ui) observed at said reflection angle u and the initial color value (a*vi; b*vi) observed at said other reflection angle v.

Advantageously, the coating 3 for controlling color in reflection is such that the optical system 40 according to the invention has a final color state with a final color value (a*vf; b*vf) in reflection at this other reflection angle v, such that a final color distance Cang(u,v)f between said final color value (a*uf; b*uf) observed at said reflection angle u and the final color value (a*vf; b*vf) observed at said other reflection angle v is smaller than said initial color distance Cang(u,v)i between said initial color value (a*ui; b*ui) observed at said reflection angle u and the initial color value (a*vi; b*vi) observed at said other reflection angle v.

The final color coordinates (a*vf; b*vf) are the color coordinates of the final color value in reflection at the other reflection angle v.

This corresponds to a variation $\Delta Cang(u,v)$ in color distance between the initial color distance Cang(u,v)i between the initial color values at said separate reflection angles in question, on the one hand, and the final color distance Cang(u,v)f between the final color values at said first and second reflection angles, on the other hand, smaller than 0, i.e.:

$$\Delta Cang(u, v) = Cang(u, v)f - Cang(u, v)i$$
$$= \sqrt{(a*uf - a*vf)^2 + (b*uf - b*vf)^2}$$
$$- \sqrt{(a*ui - a*vi)^2 + (b*ui - b*vi)^2} < 0.$$

Said color-controlling coating 3 comprises at least one layer of a material having reflection properties in the air such that the light beam LRC reflected by this coating 3 has a variation in color value as a function of the angle of reflection and/or a preset color state lower than a preset threshold value.

In particular, said coating 3 is defined so that its color, or, in other words, its color state, is closer to the reference color than that of the optical assembly to be modified and so that the angular dependency of this color of the coating 3 is lower than the angular dependency of the color in reflection of the optical assembly 50, i.e. so that the variation in color value of the coating 3 as a function of reflection angle is smaller than the variation in color value as a function of reflection angle of the optical assembly 50.

In the example detailed here, the preset color state of the light beam LRC reflected by the coating 3 for controlling color in reflection is such that a* and b* are strictly lower than zero at least in a preset range (u1, u2) of reflection angles u.

This here allows the initial yellow-green color of the optical assembly to be changed to a blue-green color.

Furthermore, the preset color state of the light beam LRC reflected by the coating 3 for controlling color in reflection is such that the distance C*(0°-60°) between the color values at the reflection angles of 0° and 60° is smaller than 5. The variation in color value as a function of reflection angle may thus be quantified by a color distance in reflection between color values at various reflection angles. This color distance as a function of reflection angle is smaller than a preset threshold value, here equal to 5. The preset threshold value could furthermore be set equal to any value lower than 8.

By way of comparison, certain substrates equipped with an electrochromic stack according to the prior art have a distance C*(0°-60°) between the color values at the reflection angles of 0° and 60° approximately equal to 12.7 to within 1.

Here, values of distance between the color values at the reflection angles of 0° and 60° are used, but other values of distance between the color values at various reflection angles, for example between 8 and 60°, may be used. It is reckoned that a variation in color is perceived by the human eye when the distance between the color values at two different reflection angles is larger than or equal to 2.

According to one embodiment of the optical system 40 according to the invention, said color-controlling coating 3 comprises at least one layer of thickness comprised between 1 and 100 nanometers of at least one material from the following:

silicon, titanium, zirconium, hafnium or tin oxide MOx with x between 1 and 3 and preferably between 1.5 and 2.5, M being one of the following compounds: Si, Ti, Zr, Hf, Sn;

niobium oxide NbOx with x between 1.5 and 3.5 and preferably between 2 and 3;

niobium, titanium, zirconium or hafnium nitride MNx with x between 0 and 2 and preferably between 0.5 and 1.5, M being one of the following compounds: Nb, Ti, Zr, Hf;

silicon nitride SiNx with x between 0.7 and 2 and preferably between 1 and 1.7;

tin nitride SnNx with x between 0 and 1.5 and preferably between 0.3 and 1;

titanium, zirconium or hafnium oxynitride MOxNy with x between 0 and 2.2 and y between 0 and 1.2, M being one of the following compounds: Ti, Zr, Hf;

silicon or tin oxynitride MOxNy with x between 0 and 2.2 and y between 0 and 1.5, M being one of the following compounds: Si, Sn;

niobium oxynitride NbOxNy with x between 0 and 2.7 and y between 0 and 1.2;

oxynitride of two compounds M1 and M2 M1M2aOxNy with a between 0 and 1, x between 0 and 4.4, y between 0 and 2.4, M1 and M2 being one of the following compounds: Ti, Zr, Hf;

tin-zirconium oxynitride SnZnaOx with a between 0 and 1.2 and x between 0 and 3.5, and preferably between 1.8 and 3.2.

In particular, the coating 3 preferably comprises at least one layer of one of the following chemical compounds: SiO2, TiO2, Nb2O5, Si3N4, ZrO2, TiZrO4, SnO2, SnZnO3, TiN, NbN, SiOxNy, HfO2, HfN, SnN, TiOxNy, NbOxNy, TiZrOxNy.

Generally, the coating 3 comprises a layer of a material of high refractive index n, for example with an index higher than 1.8, or an alternation of layers of materials of high and low indices. A material of low index has an index lower than 1.8. The thickness of each layer is smaller than 100 nanometers, preferably smaller than 90 nanometers, preferably smaller than 80 nanometers, preferably smaller than 70 nanometers, preferably smaller than 60 nanometers, preferably smaller than 50 nanometers, and preferably smaller than 40 nanometers. The total thickness of the coating is preferably smaller than 1 micron, preferably smaller than 100 nanometers, preferably smaller than 90 nanometers, preferably smaller than 80 nanometers, preferably smaller than 70 nanometers, preferably smaller than 60 nanometers, preferably smaller than 50 nanometers, and preferably smaller than 40 nanometers.

Generally, the use, within the coating 3, of layers of small thickness, i.e. of thickness smaller than 100 nm and preferably less, has a plurality of technical advantages in comparison with so-called "thick" layers of larger thickness.

Specifically, it should be noted that uncertainties related to the process used to deposit the layers vary with the thickness of the latter. In practice, such uncertainties are thus expressed in a given percentage (typically 5 or 10%) of the thickness of the layer to be deposited. When the thickness of this layer increases, potential variations in thickness also increase in absolute value, and vice versa. In other words, it is relatively more complex to deposit a so-called "thick" layer uniformly. The deposition of a layer of small thickness is therefore a process that suffers from fewer fluctuations, and is therefore more stable.

Now, any variation even if minimal in the thickness of a layer engenders a non-negligible variation in its colorwise appearance in reflection. When considered in its entirety, a so-called "thick" layer therefore exhibits a higher number of color variations in reflection.

In contrast, the deposition of layers of small thickness allows these color variations to be limited, and therefore a relatively more uniform appearance in reflection to be obtained.

This is all the more true when the observer changes angle of observation, the "radial" color uniformity of a layer being very sensitive to these local variations in thicknesses.

In particular, the coating 3 may comprise a single layer of one of these materials, or it may comprise a plurality of layers of these materials, alternated. In particular, it may comprise one or more layers of silicon nitride SiNx and of silicon oxide SiOx, or one or more layers of titanium oxide TiOx and of silicon oxide SiOx.

Each of these materials has characteristics that allow it to satisfactorily withstand environmental conditions such as moisture or friction and also to withstand heating to temperatures suitable for tempering the optical system.

In particular, in the context of the example described here, the characteristics of various possible color-controlling coatings 3 have been determined by optical modeling. These coatings 3 meet the criteria mentioned above: they have a color state in reflection with color coordinates such that $a^*<0$ and $b^*<0$ and a low color angular dependency with, for example, a color distance between the color values observed at reflection angles of 0 and 60° smaller than 5, i.e. $C^*(0°-60°)<5$.

According to one embodiment, the coating 3 may comprise a layer of silicon nitride SiNx of thickness comprised between 1 and 65 nanometers which has a color state such that $a^*<0$ and $b^*<0$. The coefficient of reflection Rtot of a glass substrate covered with this coating is comprised between 8 and 22%, with a coefficient of reflection Rout from the coating comprised between 0% and 18%. The angular dependency between 0° and 60° is lower than 3, i.e. $C^*(0°-60°)<3$.

According to another embodiment, the coating 3 may comprise a layer of titanium dioxide TiO2 of thickness comprised between 25 and 55 nanometers, which has a color state such that $a^*<0$ and $b^*<0$. The coefficient of reflection Rtot of a glass substrate covered with this coating is comprised between 21.5% and 34.5%, with a coefficient of reflection Rout from the coating comprised between 19% and 32%. The angular dependency between 00 and 60° is lower than 4, i.e. $C^*(0°-60°)<4$.

According to another embodiment, the coating 3 comprises a layer of titanium oxide TiOx and a layer of silicon oxide SiOx.

The combinations of thicknesses of titanium oxide TiOx and of silicon oxide SiOx that has a color state such that $a^*<0$ and $b^*<0$ with an angular dependency between 0° and 60° lower than 5, i.e. $C^*(0°-60°)<5$, are graphically shown in FIG. 8.

This FIG. 8 also schematically shows the coefficients of reflection Rtot from the obtained coating deposited on a glass substrate.

A coating having particularly advantageous characteristics is obtained with a layer of 15 nanometers of titanium oxide TiOx and a layer of 45 nanometers of silicon oxide SiOx.

According to another embodiment, the coating 3 comprises a layer of silicon nitride SiNx and a layer of silicon oxide SiOx.

The combinations of thicknesses of silicon nitride SiNx and of a layer of silicon oxide SiOx that have a color state such that $a^*<0$ and $b^*<0$ with an angular dependency between 0° and 60° lower than 5, i.e. $C^*(0°-60°)<5$, are graphically shown in FIG. 9. This FIG. 9 also schematically shows the coefficients of reflection Rtot from the obtained coating deposited on a glass substrate.

Another coating having particularly advantageous characteristics is obtained with a layer of 30 nanometers of silicon nitride SiNx and a layer of 30 nanometers of silicon oxide SiOx.

Other envisionable coatings may be achieved by varying the chemical composition of each layer, their thickness, their number and their relative arrangement.

Each layer of the coating may be arranged on the substrate via various means known to those skilled in the art.

It may in particular be a question of a magnetron deposition or of deposition using a wet process.

The invention also relates to a method for modifying the color intended to be observed by an observer in reflection of the optical assembly 50 for forming the optical system 40 such as described above, said method modifying the color from an initial color state having an initial color value (L*ui; a*ui; b*ui) observed at a preset first reflection angle u to a final color state having a final color value (L*uf; a*uf; b*uf) observed at this first reflection angle u, this final color state being closer than the initial color state to a reference color state having a reference color value (L*uref; a*uref; b*uref) at said first reflection angle u.

This method comprises at least one step of modifying reflection properties of the optical assembly 50 by arranging a coating 3 for controlling color in reflection on the other main face 12 of the substrate 1 of said optical system 40, i.e. the face opposite the main face 11 on which the electrochromic stack 2 is formed, so that the variation ΔCu in color distance (Cui, Cuf) between the initial color value and the reference color value, on the one hand, and between the final color value and the reference color value, on the other hand, is smaller than 0 at the reflection angle u. This step allows the color in reflection of the optical system to be brought closer to a target reference color.

Said initial color state having an initial color distance between said initial color value (L*ui; a*ui; b*ui) observed at the reflection angle u and an initial color value (L*vi; a*vi; b*vi) observed at another reflection angle v, said method comprises at least one other step of modifying reflection properties of said optical assembly 50 so that the variation ΔCang(u,v) in color distance between the initial color distance Cang(u,v)i between the initial color values at said first and second reflection angles, on the one hand, and the final color distance Cang(u,v)f between the final color values at said first and second reflection angles, on the other hand, is smaller than 0. This step allows the variation in the color in reflection of the optical system with reflection angle to be limited.

The two modifying steps are preferably carried out simultaneously, by arranging, for example by deposition, a single coating 3 on the other main face 12 of the substrate 1. It is however possible to envision various coatings being formed in succession on the face in question of the substrate, one at least of the coatings having the effect of bringing the color in reflection of the optical system closer to the target reference color and another at least of the coatings having the effect of limiting the variation in the color in reflection of the optical system with reflection angle.

The invention also relates to a process for manufacturing an optical system such as described above. This manufacturing process for example comprises the following steps, preferably in this order:
providing the substrate 1,
forming the electrochromic stack 2 on one of the main faces of the substrate,
forming the coating 3 on the other main face of the substrate,
preferably, tempering the obtained optical system.

According to another embodiment, the substrate is tempered before formation of the electrochromic stack or before formation of the coating on the substrate.

With respect to the formation of the coating 3, provision may for example be made to carry out the following steps.

In a first step, the reflection spectrum of the optical assembly 50 is measured using a spectrophotometer or any other known device of equivalent function.

On the basis of this measurement, the initial color value (a*ui; b*ui) of the optical assembly 50 in reflection at the reflection angle u is determined, for example using a known color space such as the CIE 1931 XYZ color space.

Subsequently, the initial color distance Cui between this initial color value (a*ui; b*ui) in transmission and the reference color value (a*uref; b*uref) in reflection at the reflection angle u is determined.

Next, the wavelength range in which a variation in the amount of reflected light will lead to an adequate variation in the color coordinates of the obtained optical system is determined.

Next, the material and thickness of the coating that will increase or decrease the amount of light reflected in said wavelength range, in such a way as to produce the sought-after effect on the color coordinates of the color state of the obtained optical system, are determined, for example using a computer-generated optical model.

The corresponding coating is formed on the other main face 12 of the substrate 1.

According to a process involving reverse engineering, it is also possible to determine, from the final optical system, its initial color value (L*ui; a*ui; b*ui) in reflection. To do this, it is enough to ablate the exterior coating 3, then to carry out a measurement of the reflection spectrum of the optical assembly thus deprived of its exterior coating 3.

The obtained optical system is preferably flat, but may also be curved.

According to the invention, the optical system described above may in particular be used as an architectural glazing, in particular an exterior internal-partition or glazed-door glazing, as a glazing with which internal partitions or windows of means of transport such as a train, airplane, automobile or boat is equipped, as a glazing in display screens such as computer screens or TV screens, or in camera objectives or to protect solar panels.

In particular, the optical system according to the invention may be incorporated into various glazing configurations in which the various optical elements may be organized differently to form:
a single glazing comprising the electrochromic stack 2, the substrate 1 in the form of a glass sheet, and the coating 3, and preferably arranged to place the electrochromic stack 2 in the interior of the building and the coating on the exterior;
a double glazing comprising, preferably from the exterior to the interior of the building, the coating 3, the substrate 1 in the form of a glass sheet, the electrochromic stack 2, a cavity filled with inert gas, a low-E coating and another substrate in the form of another glass sheet;
a triple glazing comprising, preferably from the exterior to the interior of the building, the coating 3, the substrate 1 in the form of a glass sheet, the electrochromic stack 2, a cavity filled with inert gas, a glass sheet, a cavity filled with inert gas, a low-E coating and another substrate in the form of another glass sheet;
a triple glazing comprising, preferably from the exterior to the interior of the building, a glass sheet, a low-E coating, a cavity filled with inert gas, the coating 3, the substrate 1 in the form of a glass sheet, the electrochromic stack 2, a cavity filled with inert gas, and a third glass sheet.

In all configurations, the coating 3 is intended to be turned toward the exterior of the building, and in all cases positioned on an external face of the optical system formed by the optical assembly 50 and the coating 3.

In all configurations, the coating 3 is located on the side of the substrate opposite the side on which the electrochromic stack is formed.

The values described in the present text must not be understood as being strictly limited to the numerical values mentioned. Rather, unless otherwise indicated, each value designates both the exact value mentioned and a range of functionally equivalent values encompassing this value.

Although particular embodiments of the present invention have been illustrated and described, it will be obvious that various other changes and modifications may be made within the spirit and scope of the invention. The present text is therefore intended to cover, in the appended claims, any modifications falling within the scope of the present invention.

The present invention is not limited to the embodiments described and shown in the different figures, and those skilled in the art will be able to implement any variant in accordance with its spirit.

The invention claimed is:

1. An optical system comprising:
    an optical assembly comprising a glazing-function substrate equipped with two opposite main faces and an electrochemical functional device with electrically controllable optical and/or energetic properties formed on one of the two opposite main faces, the electrochemical functional device comprising at least one electrochromic stack equipped with:
    a first transparent conductive layer,
    a working electrode arranged above said first transparent conductive layer,
    a counter-electrode arranged above said working electrode,
    a second transparent conductive layer arranged above said counter-electrode, lithium ions introduced into said electrochromic stack,
    and, optionally, a separate layer of an ionic conductor, which separate layer is intermediate between the working electrode and the counter-electrode,
    said optical assembly having an initial color state with an initial color value (L*ui; a*ui; b*ui) in reflection at a first reflection angle on the side of the substrate,
    a coating for controlling color in reflection, said coating being formed on the other main face of the substrate and forming an external face of said optical system, and being such that the optical system has a final color state with a final color value (L*uf; a*uf; b*uf) in reflection at the first reflection angle, the final color state being closer than an initial color state to a reference color state having a reference color value (L*uref; a*uref; b*uref) at said first reflection angle, this corresponding to a variation $\Delta Cu$ in color distance (Cui, Cuf) between the initial color value and the reference value, on the one hand, and between the final color value and the reference value, on the other hand, smaller than 0 at said preset first reflection angle, so that said variation $\Delta Cu$ is $$\Delta Cu = Cuf - Cui$$
$$= \sqrt{(a*uf - a*uref)^2 + (b*uf - b*uref)^2}$$
$$- \sqrt{(a*ui - a*uref)^2 + (b*ui - b*uref)^2} < 0$$

wherein said color-controlling coating comprises at least one layer of thickness comprised between 1 and 100 nanometers, of at least one material from the following:
MOx with x between 1 and 3, M being one of the following compounds: Si, Ti, Zr, Hf, Sn;
NbOx with x between 1.5 and 3.5;
MNx with x between 0 and 2, M being one of the following compounds: Nb, Ti, Zr, Hf;
SiNx with x between 0.7 and 2;
SnNx with x between 0 and 1.5;
MOxNy with x between 0 and 2.2 and y between 0 and 1.2, M being one of the following compounds: Ti, Zr, Hf;
MOxNy with x between 0 and 2.2 and y between 0 and 1.5, M being one of the following compounds: Si, Sn;
NbOxNy with x between 0 and 2.7 and y between 0 and 1.2;
M1M2aOxNy with a between 0 and 1, x between 0 and 4.4, y between 0 and 2.4, M1 and M2 being one of the following compounds: Ti, Zr, Hf;
SnZnaOx with a between 0 and 1.2 and x between 0 and 3.5.

2. The optical system as claimed in claim 1, wherein, an overall reflection of the optical system at the first reflection angle comprising at least one light beam reflected by the color-controlling coating, a spectrum of the reflected light beam comprises at least one spectral component located in at least one effective range of reflection wavelengths, said effective range of reflection wavelengths being defined so that a variation in reflection by the optical assembly of any amount of light at a wavelength $\lambda$ comprised in said effective reflection range engenders a variation $\Delta Cu(\lambda)$ in color distance (Cui, Cu($\lambda$)) smaller than 0 at said preset first reflection angle, where:
    with (a*ui; b*ui) the initial color coordinates of the initial color value in reflection at the first reflection angle,
    Cui the color distance between these initial color coordinates (a*ui; b*ui) and the color coordinates of said reference color value in reflection (a*uref; b*uref) at this first reflection angle,
    (a*u($\lambda$); b*u($\lambda$)) the color coordinates of the color value in reflection at the first reflection angle obtained following the reflection variation at said wavelength $\lambda$,
    Cu($\lambda$) the color distance between the color coordinates (a*u($\lambda$); b*u($\lambda$)) and the color coordinates of said reference color value in reflection (a*uref; b*uref) at the first reflection angle; said variation $\Delta Cu(\lambda)$ in color distance respects $$\Delta Cu(\lambda) = Cu(\lambda) - Cui =$$
$$\sqrt{(a*u(\lambda) - a*uref)^2 + (b*u(\lambda) - b*uref)^2} -$$
$$\sqrt{(a*ui - a*uref)^2 + (b*ui - b*uref)^2}.$$

3. The optical system as claimed in claim 2, wherein the light intensity of the spectral components of the beam reflected by said color-controlling coating and that are comprised in said effective range of reflection wavelengths make up at least 30% of a total light intensity of the beam reflected by said color-controlling coating.

4. The optical system as claimed in claim 3, wherein the light intensity of the spectral components of the beam reflected by said color-controlling coating and that are comprised in said effective range of reflection wavelengths make up at least 70% of the total light intensity of the beam reflected by said color-controlling coating.

5. The optical system as claimed in claim 1, wherein:
the initial color state of the optical assembly having an initial color value (a*vi; b*vi) in reflection at a second reflection angle that is different from the initial color value (a*ui; b*ui) in reflection at the first reflection angle, an initial color distance is defined between said initial color value (a*ui; b*ui) observed at said first reflection angle and the initial color value (a*vi; b*vi) observed at said second reflection angle,
the coating for controlling color in reflection is such that the optical system has a final color state with a final color value (a*vf; b*vf) in reflection at the second reflection angle, a final color distance between said final color value (a*uf; b*uf) observed at said first reflection angle and the final color value (a*vf; b*vf) observed at the second reflection angle being smaller than said initial color distance, said corresponding to a variation ΔCang(u,v) in color distance (Cang(u,v)i, Cang(u,v)f) between the initial color distance between the initial color values at said first and second reflection angles, on the one hand, and the final color distance between the final color values at said first and second reflection angles, on the other hand, smaller than 0, so that said variation ΔCang(u,v) is $$\Delta Cang(u, v) = Cang(u, v)f - Cang(u, v)i$$
$$= \sqrt{(a*uf - a*vf)^2 + (b*uf - b*vf)^2}$$
$$- \sqrt{(a*ui - a*vi)^2 + (b*ui - b*vi)^2} < 0.$$

6. The optical system as claimed in claim 1, wherein said color-controlling coating makes direct contact with said substrate.

7. The optical system as claimed in claim 1, wherein said color-controlling coating comprises at least one layer of a material having reflection properties such that a light beam reflected by the coating has a variation in color value as a function of the angle of reflection and/or a preset color state lower than a preset threshold value.

8. The optical system as claimed in claim 7, wherein the preset color state of the light beam reflected by the coating for controlling color in reflection is such that a* and b* are strictly lower than zero at least in a preset range of reflection angles.

9. The optical system as claimed in claim 1, wherein said at least one layer of said color-controlling coating is composed of a material from the following SiO2, TiO2, Nb2O5, Si3N4, ZrO2, TiZrO4, SnO2, SnZnO3, TiN, NbN, SiOxNy, HfO2, HfN, SnN, TiOxNy, NbOxNy, TiZrOxNy.

10. The optical system as claimed in claim 1, wherein a total thickness of the coating is smaller than 1 micron.

11. The optical system as claimed in claim 10, wherein the total thickness of the coating is smaller than 40 nanometers.

12. The optical system as claimed in claim 1, wherein at least 20% of the total light intensity of the overall reflection from the optical system at the reflection angle is due to reflection from said color-controlling coating.

13. The optical system as claimed in claim 12, wherein at least 60% of the total light intensity of the overall reflection from the optical system at the reflection angle is due to reflection from said color-controlling coating.

14. A process comprising manufacturing an optical system as claimed in claim 1.

15. A process comprising providing an architectural glazing, or a glazing with which internal partitions or windows of a vehicle of transport, or a glazing in a display screen, or in a camera objective or a solar panel with an optical system as claimed in claim 1.

16. The process as claimed in claim 15, wherein the vehicle of transport is a train, an airplane, an automobile or a boat, and wherein the display screen is a computer screen or a TV screen.

17. The optical system as claimed in claim 1, wherein the material is from the following:
MOx with x between 1.5 and 2.5, M being one of the following compounds: Si, Ti, Zr, Hf, Sn;
NbOx with x between 2 and 3;
MNx with x between 0.5 and 1.5, M being one of the following compounds: Nb, Ti, Zr, Hf;
SiNx with x between 1 and 1.7;
SnNx with x between 0.3 and 1;
SnZnaOx with a between 0 and 1.2 and x between 1.8 and 3.2.

18. A method for modifying a color intended to be observed by an observer in reflection of an optical assembly for forming an optical system, said optical assembly comprising a glazing-function substrate equipped with two opposite main faces and an electrochemical functional device with electrically controllable optical and/or energetic properties formed on one of these two main faces of the substrate, the electrochemical functional device comprising at least one electrochromic stack equipped with:
a first transparent conductive layer,
a working electrode arranged above said first transparent conductive layer,
a counter-electrode arranged above said working electrode,
a second transparent conductive layer arranged above said counter-electrode,
lithium ions introduced into said electrochromic stack,
and, optionally, a separate layer of an ionic conductor, which separate layer is intermediate between the working electrode and the counter-electrode, said method modifying the color from an initial color state having an initial color value (L*ui; a*ui; b*ui) observed at a preset first reflection angle to a final color state having a final color value (L*uf; a*uf; b*uf) observed at the first reflection angle, the final color state being closer than the initial color state to a reference color state having a reference color value (L*uref; a*uref; b*uref) at said first reflection angle,
said method comprising modifying reflection properties by arranging a coating for controlling color in reflection on the other main face of the substrate of said optical system, so that a variation ΔCu in color distance (Cui, Cuf) between the initial color value and the reference color value, on the one hand, and between the final color value and the reference color value, on the other hand, is smaller than 0 at said first reflection angle, so that said variation $\Delta Cu$ is $$\Delta Cu = Cuf - Cui$$
$$= \sqrt{(a*uf - a*uref)^2 + (b*uf - b*uref)^2}$$
$$- \sqrt{(a*ui - a*uref)^2 + (b*ui - b*uref)^2} < 0$$

wherein said color-controlling coating comprises at least one layer of thickness comprised
between 1 and 100 nanometers of at least one material from the following:
MOx with x between 1 and 3, M being one of the following compounds: Si, Ti, Zr, Hf, Sn;
NbOx with x between 1.5 and 3.5;
MNx with x between 0 and 2, M being one of the following compounds: Nb, Ti, Zr, Hf;
SiNx with x between 0.7 and 2;
SnNx with x between 0 and 1.5;
MOxNy with x between 0 and 2.2 and y between 0 and 1.2, M being one of the following compounds: Ti, Zr, Hf;
MOxNy with x between 0 and 2.2 and y between 0 and 1.5, M being one of the following compounds: Si, Sn;
NbOxNy with x between 0 and 2.7 and y between 0 and 1.2;
M1M2aOxNy with a between 0 and 1, x between 0 and 4.4, y between 0 and 2.4, M1 and M2 being one of the following compounds: Ti, Zr, Hf;
SnZnaOx with a between 0 and 1.2 and x between 0 and 3.5, and preferably between 1.8 and 3.2.

19. The method as claimed in claim 18, wherein, said initial color state having an initial color distance between said initial color value (L*ui; a*ui; b*ui) observed at said first reflection angle and an initial color value (L*vi; a*vi; b*vi) observed at a second reflection angle,
said method comprising modifying reflection properties of the external face of said optical assembly so that a variation $\Delta Cang(u,v)$ in color distance (Cang(u,v) i, Cang(u,v) f) between the initial color distance between the initial color values at said first and second reflection angles, on the one hand, and the final color distance between the final color values at said first and second reflection angles, on the other hand, is smaller than 0, so that said variation $\Delta Cang(u,v)$ is $$\Delta Cang(u, v) = Cang(u, v)f - Cang(u, v)i$$
$$= \sqrt{(a*uf - a*vf)^2 + (b*uf - b*vf)^2}$$
$$- \sqrt{(a*ui - a*vi)^2 + (b*ui - b*vi)^2} < 0.$$

20. The method as claimed in claim 18, wherein the material is from the following:
MOx with x between 1.5 and 2.5, M being one of the following compounds: Si, Ti, Zr, Hf, Sn;
NbOx with x between 2 and 3;
MNx with x between 0.5 and 1.5, M being one of the following compounds: Nb, Ti, Zr, Hf;
SiNx with x between 1 and 1.7;
SnNx with x between 0.3 and 1;
SnZnaOx with a between 0 and 1.2 and x between 1.8 and 3.2.

* * * * *